Figures 1, 2:
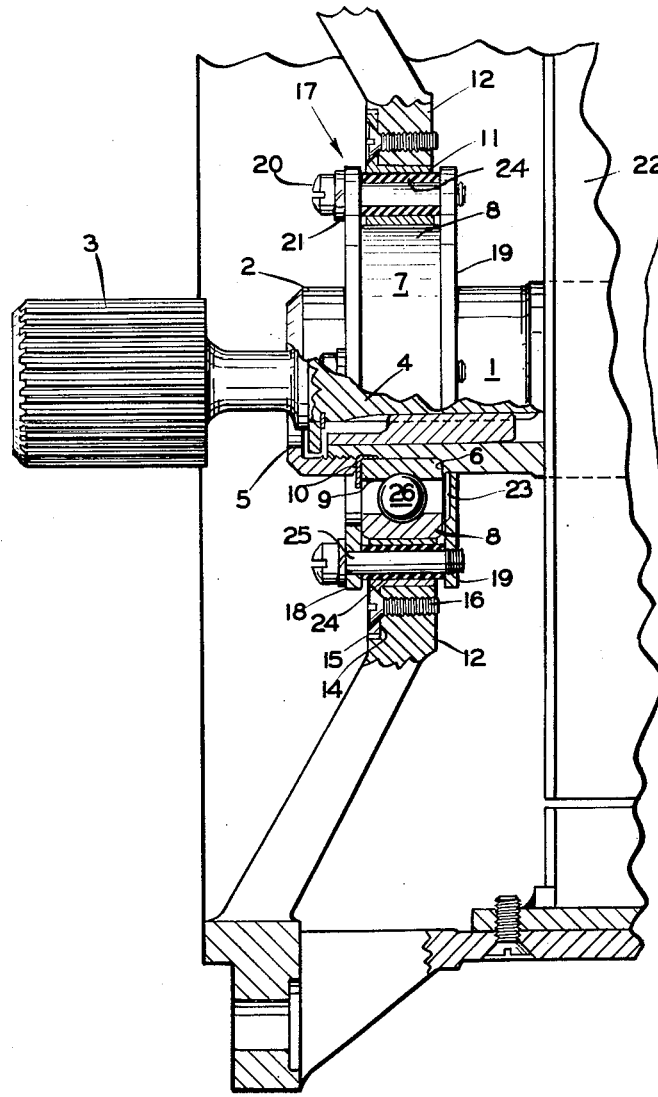

Sept. 11, 1956   F. M. POTTER   2,762,666

BALL BEARING RETAINING MEANS

Filed June 9, 1954

INVENTOR.
FREDERICK M. POTTER
BY
Nicholas J. Garofalo
ATTORNEY

2,762,666

BALL BEARING RETAINING MEANS

Frederick M. Potter, Westwood, N. J., assignor to Bendix Aviation Corporation, Teterboro, N. J., a corporation of Delaware Application June 9, 1954, Serial No. 435,398

7 Claims. (Cl. 308—184)

This invention relates to ball bearing retaining means. It is particularly concerned with practical and novel means for retaining a ball bearing on a rotating shaft so as to prevent rotation of the bearing's outer race and at the same time to permit axial movement of the bearing with any axial displacement of the rotating shaft.

This is accomplished by clamping the outer race of the bearing between a pair of ring plates and by positioning the bearing in the bore of a housing of narrower dimension than the outer race of bearing, whereby a space is provided between the plates on either side of the wall of the housing. By this arrangement, axial displacement of the bearing is possible and rotatable movement of the bearing's outer race is limited by a plurality of bolts through the wall of the housing which hold the plates in clamped position about the outer race.

A feature of the invention lies in resilient bushings which sleeve the bolts, whereby pounding of the bolts in their holes is eliminated. This feature is of decided advantage, particularly where the shaft that carries the bearing together with the housing that contains the bearing are subject to considerable vibration. In such cases, the pounding of the bolts in their holes would deform the holes and wear down the bolts and, as a consequence, would defeat the purpose of the device and allow some rotation of the bearing's outer race.

A further feature of the invention lies in the particular structure of one of the clamping rings. This ring has an inner diameter which is intended to be in close proximity or light contact with the bearing shaft that passes through it. This ring provides the advantages of a guide in assembling the clamping plates about the bearing for, without it, it would be exceedingly difficult to align the two opposed plates together for receiving the clamp bolts. A further advantage provided by this ring plate is to prevent dirt from being blown into the bearing, and for this reason, it is used on that side of the bearing which faces the device carried for rotation by the shaft.

A general object of the invention is, therefore, to retain a ball bearing on a rotating shaft in a practical and advantageous manner, whereby axial movement of the bearing is allowed with axial displacement of the shaft but rotation of the outer race of the bearing is restrained.

A still further object of the invention is to clamp in a housing a bearing carried on a rotatable shaft by bolt means through the housing in such manner that the bearing is permitted axial movement but the outer race of the bearing is restrained and so that the effects of pounding of the bolts in their holes with vibration of the device carrying the bearing is eliminated.

The invention further lies in the particular construction and arrangement of the various elements of the bearing retaining means as well as in their cooperative association with one another to produce the results intended.

The foregoing and other objects and advantages of the invention will appear more fully hereinafter from a consideration of the detailed description which follows, taken together with the accompanying drawing, wherein an embodiment of the invention is illustrated. It is to be expressly understood, however, that the drawing is for purposes of illustration and description, and is not to be construed as defining the limits of the invention.

In the drawing:

Fig. 1 is a side elevational view of bearing retaining means embodying the invention, some parts being sectioned for clarity; and Fig. 2 is a detail in perspective of an enlarged section through the ring member.

In the drawing there is disclosed the drive end of a drive shaft 1. Threaded onto the end of the shaft is a retaining nut 2 which holds to the shaft a spline drive connecting member 3. The latter has an axial extension 4 which is spline-fitted into a hollow in the end of the shaft. An inwardly extending flange 5 of the nut is arranged to limit against collar means of the spline member to hold the latter to the shaft.

The shaft end is reduced so as to provide an annular shoulder 6. Fitted onto this reduced end is a ball bearing member 7 having an outer race 8 and an inner race 9. The inner race is gripped securely between the shoulder 6 and the end wall 10 of the nut member. The outer race 8 is contained in the bore of a ring member 11 which in turn is fitted into the bore of a stationary housing support 12.

Ring member 11 is thickened radially and is of narrower axial dimension than the outer race element 8. One end wall of the ring member continues radially out from the main body portion thereof to provide a flange 14. The latter is contained in an annular recess 15 about one end of the bore of the housing support, and it is held securely therein by a plurality of screws 16. The ring 11 is a removable part of the support 12.

It is clear that some axial displacement of the drive shaft will take place as the latter functions, and that as a consequence, the bearing will also be axially displaced in the bore of the ring member 11.

To avoid any tendency of the outer race 8 to rotate in the bore of the ring member concomitantly with the rotation of the drive shaft and with the vibration of the associated housing support, the outer race 8 is restrained against any such movement by suitable clamping means 17.

The clamping means includes a pair of opposed parallel ring plates 18 and 19, between which the outer race member 8 is securely gripped. The plates are held in gripping position by a plurality of bolts 20. The bolts pass through the outer ring plate 18 and through holes of the housing ring 11, and the ends thereof are threadedly engaged in holes of the inner ring plate 19. The bolts are further secured by lock washers 21. The several holes carrying the bolts are spaced equally apart about the ring plates and housing ring. Here, four bolts 20 spaced equally apart from one another, are provided.

The outer ring plate 18 is of narrow radial dimension and does not extend radially inward beyond the end wall of the outer bearing race 8. This is intended so as to allow access of air to the bearing for cooling purposes. The inner ring plate might be similar to the outer ring, but differs somewhat because of its inaccessible position against the inner side of the bearing. It is in a limited space between the housing structure and the end wall of a generator 22 or other device carried upon the drive shaft. In such a case, it is clear that it would be difficult to align the holes of both ring plates 18 and 19 for securing the one to the other by the bolts. To avoid this difficulty, the diameter of the axial opening of the inner ring plate lightly touches or barely clears the surface of the shaft. By this arrangement, the inner ring plate will not wabble or nod about the shaft and it will assume a vertical position, so as to permit easy threading of the bolt members therein.

The inner ring plate 19 covers up the inner side of the bearing against attack of dirt and foreign particles that would otherwise be blown into the bearing by the wind force of the device 22 that rotates with the drive shaft. To prevent overheating or rapid heating of the bearing, that portion of the inner face of the ring plate which extends inward beyond the outer race is recessed as indicated so as to provide a separating air space 23 for air circulation.

Now, as the drive shaft rotates and the generator 22 is carried about with it, the vibration of the housing support and the tendency of the bearing to rotate therein would cause pounding of the clamp bolts 20 in their holes. Continuous pounding of the bolts would wear the bolt hole walls, as well as the bolts, and soon would allow the bearing to rotate to the extent of the wearing. Now, this effect of the pounding of the bolts is eliminated by placing sleeves 24 or bushings of resilient material in the bolt holes of the housing ring member. The sleeves are preferably of tough wear resistant plastic material. The resilient plastic material serves to absorb the shock of pounding and prevents wearing of the bolt holes. Plastics such as Teflon, Neoprene or the like serve well for this purpose. Teflon is a commercial product, chemically known as tetrafluorethylene. It is also desirable that the shanks 25 of the bolts be smooth with the exception of the ends thereof that engage in the threaded holes of the inner ring plate. This is desirable so as to prevent biting into the bushing wall which would otherwise happen were the shanks threaded.

By the foregoing arrangement, it is clear that as the shaft rotates, the inner race of the bearing will be carried about with it, the inner race rolling over the bearing balls 26. It will also be clear that the outer bearing race will be restrained against rotation by the clamping means 17. It will also be clear that limited axial movement of the bearing will be allowed with correspondingly limited displacement of the drive shaft. The extent of axial displacement of the bearing and drive shaft will be limited by the marginal portions of one ring plate limiting against one face of the narrow support 12 as the bearing is displaced in one direction and by the other ring plate limiting against the opposite face of the support 12 as the bearing is displaced in the opposite direction.

It is to be noted that the housing ring plate 11 is removable by withdrawing the screw members 16. This permits ready replacement or repairs of the bearing in case of damages, or other reasons requiring removal of the bearing. It further avoids the necessity of replacing the more expensive support 12 in the effect the ring member 11 is damaged.

Although but one embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art.

What I claim is:

1. In means retaining a ball bearing member including an inner race and an outer race on a rotating shaft in such manner that the bearing member is displaceable axially to a limited degree with axial movement of the shaft and the outer race is restrained against rotating, the inner race being gripped fast on a reduced end of the shaft between a shoulder of the shaft and a nut threaded on the end of the shaft: a stationary support having a bore in which the outer race of the bearing is fitted, the stationary support being of narrower axial dimension than the outer race, the stationary support having at least four transverse holes spaced equally from one another around the bore; a first ring plate positioned parallel to one face of the support, to a side face of the outer race, and having a plurality of holess aligned with the support holes; a second ring plate having a plurality of threaded holes aligned with the support holes and positioned parallel to the opposite face of the support and the other side face of the outer race; a plurality of headed bolts having shank portions passed through the holes of the first ring plate and those of the support, each bolt including a threaded end engaged in a threaded hole of the second ring plate, the first and second plates being drawn by the bolts into gripping abutment against opposite side faces of the outer race, and the outer race being restrained thereby against rotation; and each ring plate having a diameter greater than that of the outer bearing race so that upon axial movement of the ring plates and bearing member as a unit in one direction for a limited distance relative to the stationary support, the marginal edge of one ring plate will limit against one face of the stationary support, and upon movement of the unit in the opposite direction for a limited distance, the other ring plate will limit against the opposite face of the stationary support.

2. In means as in claim 1, wherein the stationary support includes a main body portion having a thickened ring member removably attached to the main body portion and including the bore in which the outer race of the bearing is fitted.

3. In means as in claim 1, wherein a resilient bushing of tough, wear resistant plastic is provided in each support hole and sleeves the shank of the bolt therein, the bushing serving to absorb the effects of pounding of the bolts in the holes on vibration of the drive shaft and stationary support.

4. In means as in claim 3, wherein the shanks of the bolts contained in the bushings are smooth to prevent biting into the bushings on pounding.

5. In combination, a rotary shaft, a ball bearing member having an inner race and an outer race wherein the inner race is mounted fast upon the shaft, a radially thickened collar member having its inner wall in contact with the peripheral surface of the outer race, the axial length of the outer race being greater than that of the collar and extending beyond opposite ends of the collar, a pair of ring plates positioned in spaced relation to opposite ends of the collar and in abotment with opposite sides of the outer race, a plurality of equally spaced bolts projecting through axially aligned holes of the ring plates and the collar and securing the ring plates in tight abutting contact with the opposite sides of the outer race, and a peripheral flange about one end of the collar adapted to be removably attached to a stationary support, the bearing member and abutting ring plates being subject to axial displacement as a unit with the rotary shaft relative to the collar member and being limited in the degree of such displacement by abutment of one or the other of the ring plates against the collar member accordingly as the unit is displaced in one direction or the other.

6. In the combination as in claim 5, wherein each hole of the collar carries a sleeve of tough, wear resistant plastic accommodating the shank portion of a related bolt.

7. In combination, a ball bearing member having an inner race and an outer race, a collar element having a radially thickened wall sleeving the outer race, a pair of ring plates positioned on opposite sides of the outer race and in abutment therewith, the ring plates having a marginal portion overlapping the opposite ends of the collar element in spaced relation thereto, a plurality of bolt members passed through equally spaced aligned holes of the ring plates and collar member and holding the ring plates in gripping contact with the opposite sides of the outer race, bushings of tough, wear resistant plastic sleeving the shank portions of the bolts between the ring plates, and a peripheral flange about the collar adapted for securing the collar to a stationary support.

References Cited in the file of this patent

UNITED STATES PATENTS

| | | |
|---|---|---|
| 1,972,581 | Barker | Sept. 4, 1934 |
| 2,070,081 | Henry | Feb. 9, 1937 |